US012041210B2

(12) United States Patent
Migita et al.

(10) Patent No.: US 12,041,210 B2
(45) Date of Patent: **\*Jul. 16, 2024**

(54) IMAGE READING APPARATUS WITH PLANTEN AND DOCUMENT FEEDER FOR REDUCING DAMAGE TO ELASTIC LAYER DUE TO FORCE OF ATTRACTION

(71) Applicant: SEIKO EPSON CORPORATION, Tokyo (JP)

(72) Inventors: Koji Migita, Kitakyushu (JP); Yutaro Kajitani, Matsumoto (JP); Masato Ogawa, Shiojiri (JP)

(73) Assignee: Seiko Epson Corporation, Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 17/819,021

(22) Filed: Aug. 11, 2022

(65) Prior Publication Data

US 2022/0394148 A1 Dec. 8, 2022

Related U.S. Application Data

(63) Continuation of application No. 16/924,533, filed on Jul. 9, 2020, now Pat. No. 11,463,601.

(30) Foreign Application Priority Data

Jul. 12, 2019 (JP) .................................. 2019-129996
Oct. 25, 2019 (JP) .................................. 2019-194112

(51) Int. Cl.
*H04N 1/10* (2006.01)
*H04N 1/08* (2006.01)

(52) U.S. Cl.
CPC ......... *H04N 1/1065* (2013.01); *H04N 1/0834* (2013.01); *H04N 1/0891* (2013.01)

(58) Field of Classification Search
CPC .. H04N 1/1065; H04N 1/0834; H04N 1/0891; H04N 1/103; H04N 1/00559; H04N 1/00976
(Continued)

(56) References Cited

U.S. PATENT DOCUMENTS 6,697,600 B2   2/2004   Nishikino et al.
10,455,106 B2  10/2019  Tsuji et al.
(Continued)

FOREIGN PATENT DOCUMENTS

JP   2003-066545   3/2003
JP   2006038992    2/2006
(Continued)

*Primary Examiner* — Chad Dickerson
(74) *Attorney, Agent, or Firm* — WORKMAN NYDEGGER

(57) ABSTRACT

An image reading apparatus includes a platen on which a document is to be placed, an image sensor configured to read an image of the document on the platen, an opening/closing member configured to cover and uncover the platen, a document pressing layer disposed on a surface of the opening/closing member and configured to press the document on the plate when the opening/closing member covers the platen, elastic layers located between the document pressing layer and the opening/closing member and spaced apart from each other on a surface of the document pressing layer, and connection layers connecting the elastic layers to the opening/closing member. An area of the elastic layer is larger than an area of the connection layer.

20 Claims, 14 Drawing Sheets

(58) Field of Classification Search
USPC ...... 358/474, 498; 347/84–87; 399/328, 330
See application file for complete search history.

(56) References Cited

U.S. PATENT DOCUMENTS

| | | | |
|---|---|---|---|
| 2002/0191996 A1 | 12/2002 | Nishikino et al. | |
| 2012/0081765 A1* | 4/2012 | Takeuchi ........... | H04N 1/00588 358/498 |
| 2015/0288844 A1 | 10/2015 | Enomoto et al. | |
| 2018/0278787 A1* | 9/2018 | Tsuji ..................... | H04N 1/103 |

FOREIGN PATENT DOCUMENTS

| | | | |
|---|---|---|---|
| JP | 2006038992 A | * | 2/2006 |
| JP | 4774697 B | | 9/2011 |
| JP | 2015149613 | | 8/2015 |
| JP | 2015149613 A | * | 8/2015 |
| JP | 6326842 B | | 5/2018 |
| JP | 2018-164205 | | 10/2018 |

* cited by examiner

IMAGE READING APPARATUS WITH PLANTEN AND DOCUMENT FEEDER FOR REDUCING DAMAGE TO ELASTIC LAYER DUE TO FORCE OF ATTRACTION

The present application is a continuation of U.S. patent application Ser. No. 16/924,533, filed Jul. 9, 2020, which is based on, and claims priority from JP Application Serial Number 2019-129996, filed Jul. 12, 2019 and JP Application Serial Number 2019-194112, filed Oct. 25, 2019, the disclosures of which are hereby incorporated by reference herein in their entirety.

BACKGROUND

1. Technical Field

The present disclosure relates to an image reading apparatus that reads images of documents.

2. Related Art

In a scanner, which is one type of image reading apparatus, particularly a flatbed scanner that reads an image by using a read sensor moving under a platen glass, an opening/closing member that covers and uncovers the platen glass has a document pressing layer on a surface adjacent to the platen glass to press a document. The document pressing layer includes an elastic member, such as a sponge member, and is deformable to conform to the shape of the document.

In many cases, the document pressing layer includes a mat to be in contact with a document. The mat is in close contact with the platen glass when the opening/closing member is closed. In this configuration, when the opening/closing member is opened, the force of attraction generated between the mat and the platen glass pulls the elastic member off the document pressing layer, resulting in damage to the elastic member. The elastic member is likely to be damaged at the edge. To solve the problem, in the image reading apparatus described in Japanese Patent No. 4774697, a film is disposed such that the distance between the mat and the opening/closing member is set so as not to damage the elastic member.

In the configuration described in Japanese Patent No. 4774697, the installation of the film requires careful consideration so that the distance between the mat and the opening/closing member is not excessive. Installation of the film requires additional work, leading to an increase in cost of the image reading apparatus.

SUMMARY

To solve the above-described problem, an image reading apparatus according to an aspect of the present disclosure includes a platen having a document placement surface on which a document is placed, an image sensor that is elongated in a first axis direction and configured to read an image of a document on the document placement surface while moving in a second axis direction intersecting the first axis direction, an opening/closing member configured to be closed and opened to cover and uncover the platen, a document pressing layer disposed on a surface of the opening/closing member that faces the document placement surface when the opening/closing member is closed and configured to press a document on the document placement surface, elastic layers located between the document pressing layer and the opening/closing member and spaced apart from each other on a surface of the document pressing layer adjacent to the opening/closing member, and connection layers connecting the elastic layers to the opening/closing member. The area of the elastic layers is larger than the area of the connection layers.

DESCRIPTION OF EXEMPLARY EMBODIMENTS

Figure 1:
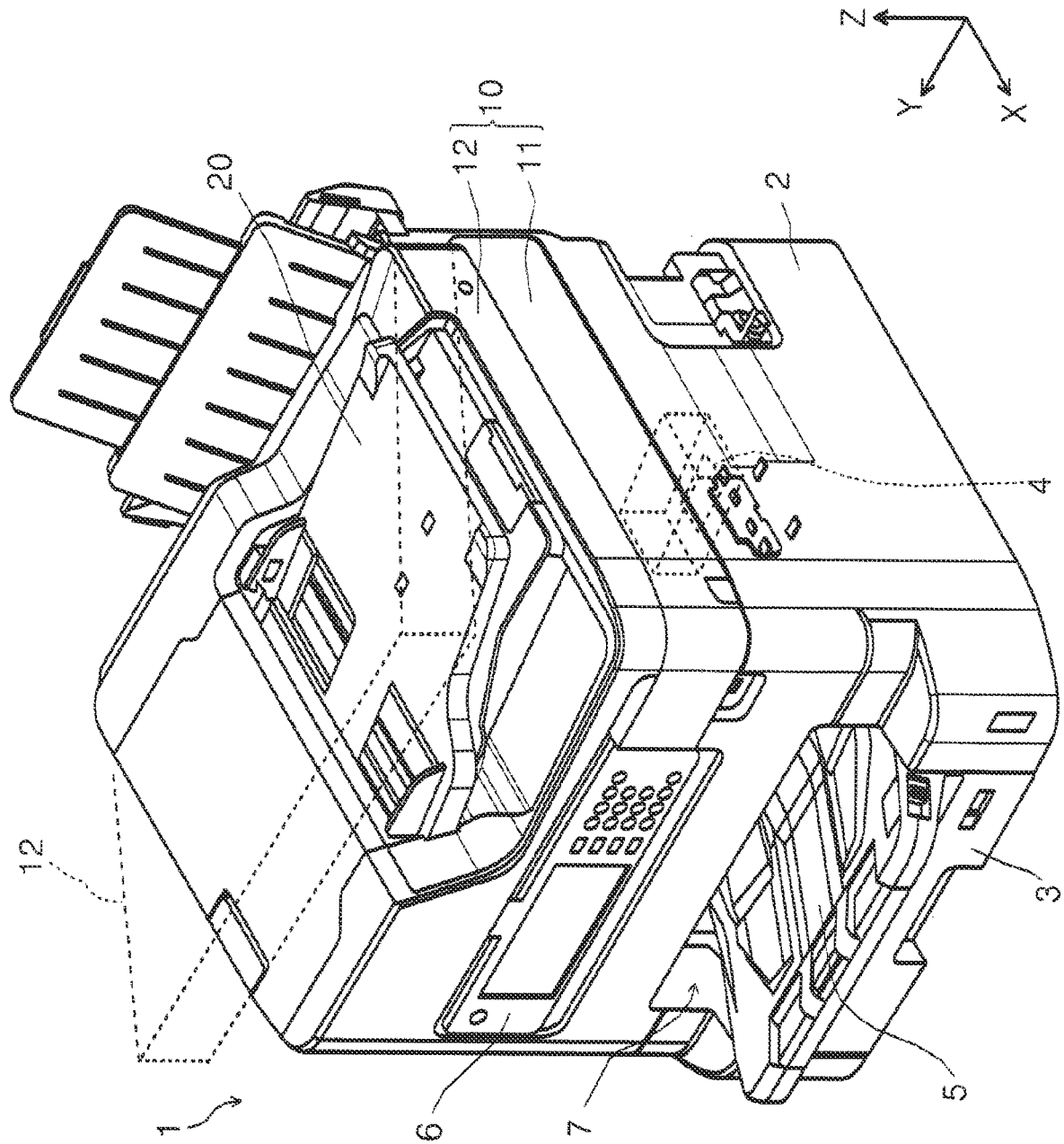
FIG. 1 is a perspective external view illustrating a multifunctional device including a scanner unit.

Hereinafter, the present disclosure is roughly described. An image reading apparatus according to a first aspect includes a platen having a document placement surface on which a document is placed, an image sensor that is elongated in a first axis direction and configured to read an image of a document on the document placement surface while moving in a second axis direction intersecting the first axis direction, an opening/closing member configured to be closed and opened to cover and uncover the platen, a document pressing layer disposed on a surface of the opening/closing member that faces the document placement surface when the opening/closing member is closed and configured to press a document on the document placement surface, elastic layers located between the document pressing layer and the opening/closing member and spaced apart from each other on a surface of the document pressing layer adjacent to the opening/closing member, and connection layers connecting the elastic layers to the opening/closing member. The area of the elastic layers is larger than the area of the connection layers.

According to the first aspect, the elastic layers are less likely to be pulled up by the connection layers at end portions when the closed opening/closing member is opened, because the area of the elastic layers is larger than the area of the connection layers, suppressing damage to the elastic layers from occurring. This configuration eliminates the need for a special component for damage suppression, reducing the cost of the device.

In a second aspect according to the first aspect, the elastic layers include an elastic member and a sheet covering a surface of the elastic member adjacent to corresponding one of the connection layers.

When the opening/closing member is opened, the elastic layer may be pulled up by the connection layer at a surface of the elastic member adjacent to the connection layer. In such a case, according to the second aspect, the surface of the elastic member is less likely to be locally stripped, because the elastic layer includes the elastic member and the sheet covering the surface of the elastic member adjacent to the connection layer, suppressing damage to the elastic member from occurring.

In a third aspect according to the second aspect, the opening/closing member is a document feeder including a tray on which a document is placed and a curved reversing path on which the document from the tray is curved and reversed. The elastic layers include a first elastic layer not overlapping the curved reversing path and a second elastic layer located under the curved reversing path. The elastic member constituting the second elastic layer has a lower density than the elastic member constituting the first elastic layer.

When the opening/closing member is the document feeder having the curved reversing path on which a document is curved and reversed, the weight of the document feeder is likely to be high at a portion that includes the curved reversing path. Thus, a portion of the document pressing layer under the curved reversing path is likely to be in close contact with the platen, increasing the force of attraction between the document pressing layer and the platen. In the region, the elastic layers are likely to be damaged. However, according to the third aspect, the elastic layers include the first elastic layer not overlapping the curved reversing path and the second elastic layer located under the curved reversing path. The elastic member constituting the second elastic layer has a higher density than the elastic member constituting the first elastic layer. This configuration effectively suppresses damage to the elastic layer located under the curved reversing path.

In a fourth aspect according to any one of the first to third aspects, the elastic layers protrude from the connection layers over the entire perimeters of the connection layers with the connection layers being disposed on the elastic layers.

According to the fourth aspect, damage to the elastic layers over the entire perimeter is less likely to occur because the elastic layers protrude from the connection layer over the entire perimeter of the connection layer with the connection layer being disposed on the elastic layers.

In a fifth aspect according to any one of the first to third aspects, the opening/closing member is configured to pivot to cover and uncover the platen, and the elastic layers protrude from the connection layers at least toward a free end of the opening/closing member with the connection layers being disposed on the elastic layers.

In this configuration in which the opening/closing member pivots to cover and uncover the platen, when the closed opening/closing member is opened, the elastic layer is likely to be pulled up by the connection layer at an end portion adjacent to the free end of the opening/closing member. Thus, the end portion may be damaged. However, according to the fifth aspect, damage at the end portions of the elastic layers adjacent to the free end of the opening/closing member is effectively suppressed from occurring because the elastic layers protrude from the connection layers at least toward the free end of the opening/closing member.

In a sixth aspect according to any one of the first to fifth aspects, the connection layers are a hook-and-loop fastener including a loop layer and a hook layer pressed together for fastening; the hook layer is disposed on the opening/closing member and the loop layer is disposed on corresponding one of the elastic layers.

In the configuration in which the connection layer is a hook-and-loop fastener including a loop layer and a hook layer pressed together for fastening, when the loop layer and the hook layer are repeatedly attached and detached from each other, the loops of the loop layer may be damaged, reducing the fastening strength. However, in the sixth aspect, the loop layer is disposed on the elastic layer, which is detachable from the opening/closing member. This enables the loop layer to be readily replaced when the fastening strength is reduced.

In a seventh aspect according to any one of the first to sixth aspects, the document pressing layer includes, in this order from the document placement surface to the opening/closing member in the thickness direction of a document, a mat to be in contact with a document, a leveling member attached to the mat to eliminate irregularities, and a plate layer attached to the leveling member.

According to the seventh aspect, the advantages of any one of the first to sixth aspects are obtained in the document pressing layer including the mat, the leveling member, and the plate layer.

In an eighth aspect according to the third aspect, the document pressing layer includes, in this order from the document placement surface to the opening/closing member in a thickness direction of a document, a mat to be in contact with a document, a leveling member attached to the mat to eliminate irregularities, and a plate layer attached to the leveling member. The opening/closing member includes an opening portion configured to be opened downward to expose a portion of the curved reversing path. The plate layer includes a first plate layer not overlapping the opening portion and a second plate layer spaced apart from the first plate layer and overlapping the opening portion. The second plate layer is configured to move together with the opening portion when the opening portion is opened and closed. An intermediate sheet extending from the second plate layer to the first plate layer is disposed between the leveling member and the plate layer. The coefficient of friction between the intermediate sheet and the leveling member is smaller than the coefficient of friction between the plate layer and the leveling member.

The opening/closing member includes the opening portion that is opened downward to expose a portion of the curved reversing path. When the opening portion is opened, the document pressing layer deforms. If the leveling member does not slip against the plate layer at this time, the mat and the leveling member will be unnaturally curved and partially bent when the opening portion is opened. In such a case, the mat may have an undesirable fold line. However, according to the eighth aspect, the intermediate sheet extending from the second plate layer to the first plate layer is disposed between the leveling member and the plate layer. The leveling member slides against the plate layer when the opening portion is opened, because the coefficient of friction between the intermediate sheet and the leveling member is smaller than that between the plate layer and the leveling member. Thus, the mat and the leveling member are naturally curved, reducing the possibility that the mat will have an undesirable fold line.

Hereinafter, the present disclosure is described in detail. A scanner unit 10 is described below as an example of an image reading apparatus. In the drawings, the X-Y-Z coordinate is a coordinate in the Cartesian coordinate system in which the Y-axis direction is a direction of movement of a first image sensor 16, which will be described later, of the scanner unit 10 or a second axis direction; the X-axis direction is a longitudinal direction of the first image sensor 16, which will be described later, of the scanner unit 10 or a first axis direction; and the Z-axis direction is a vertical direction or a height direction of the device, i.e., the scanner unit 10. The Z-axis direction corresponds to the thickness direction of a document in the scanner unit 10. The +X direction indicates a front side of the device and the −X direction indicates the rear side of the device.

A multifunctional device 1 illustrated in FIG. 1 includes a recording unit 2 and the scanner unit 10 disposed above the recording unit 2 and has both recording functionality and image reading functionality. The multifunctional device 1 includes an operation unit 6 at the front upper portion. The operation unit 6 includes a display, such as a liquid crystal panel. A user can enter, through the operation unit 6, instructions into the multifunctional device 1, such as an instruction to record by using the recording unit 2 and an instruction to read an image by using the scanner unit 10.

The recording unit 2 of the multifunctional device 1 includes a sheet cassette 3, which holds recording paper, at the lower side. The recording unit 2 includes a recording portion 4. The recording portion 4 records on recording paper from the sheet cassette 3. After recording, the recording paper is ejected through an output 7 onto a recording unit output tray 5.

Figure 2:
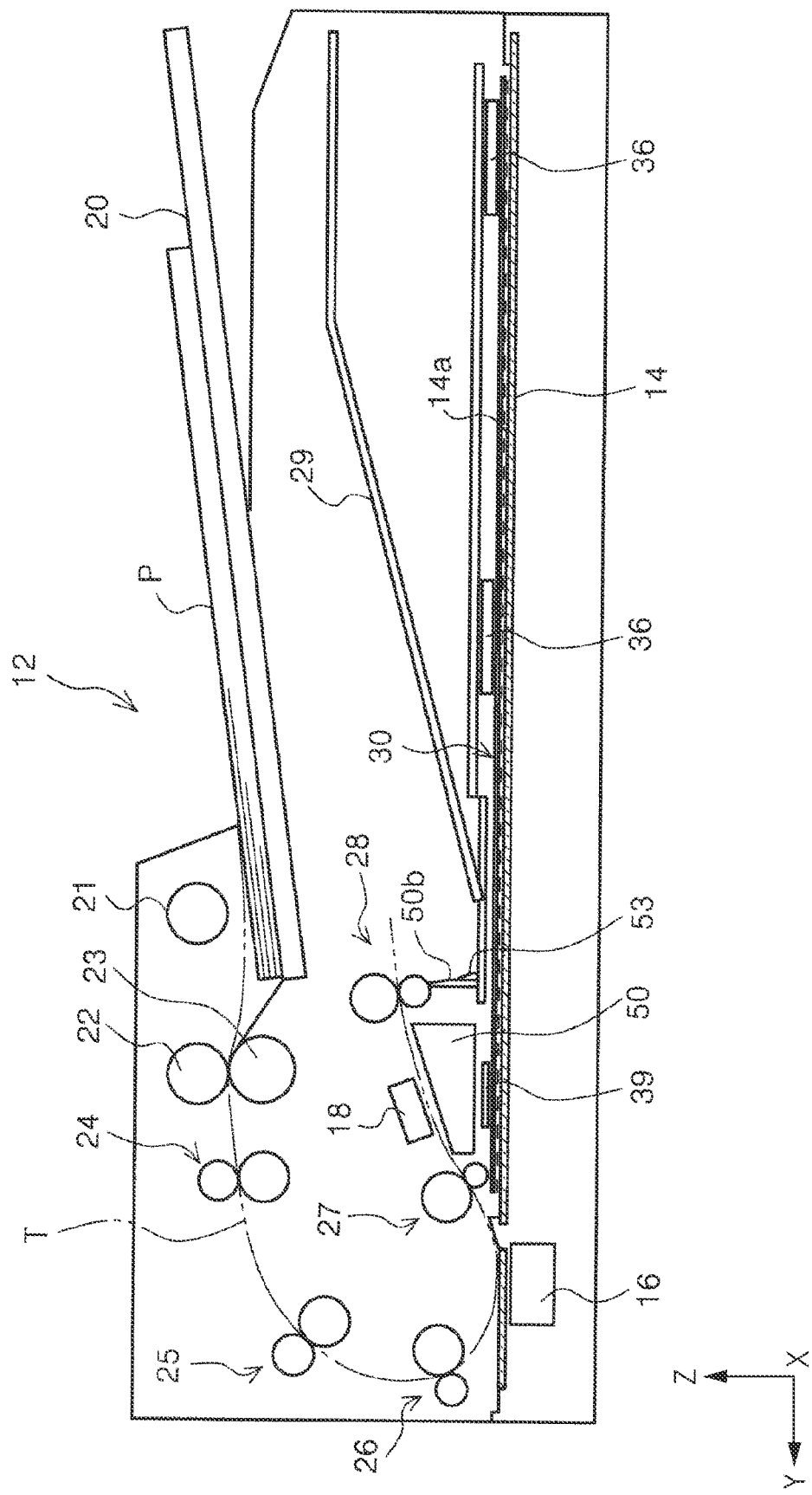
FIG. 2 schematically illustrates a document transportation path in the scanner unit.

Next, the scanner unit 10 is described. The scanner unit 10 includes a scanner main body 11 that reads an image of a document on the document placement surface 14a of the platen 14 illustrated in FIG. 2 and a document feeder 12 that automatically transports a document on a feeding tray 20 and reads an image of the document. In FIG. 2, reference P indicates a document on the feeding tray 20.

Figure 3:
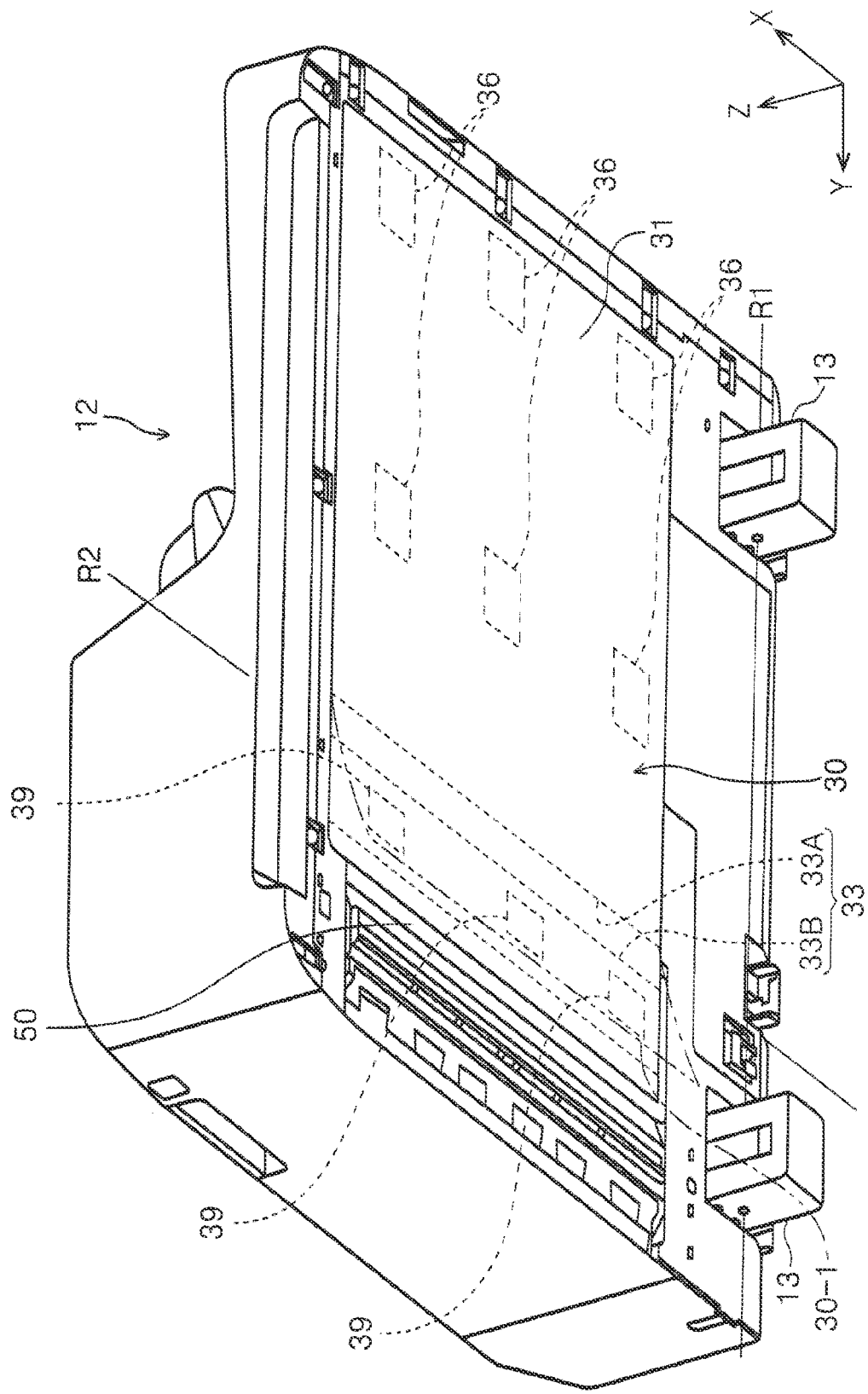
FIG. 3 is a bottom perspective view of the scanner unit.

As illustrated in FIG. 3, the document feeder 12 located above the scanner main body 11 includes two torque hinges 13 at the ends in the −X direction and pivots about the axis R1 of the rotation shaft in the torque hinges 13. The axis R1 extends in the Y-axis direction. The document feeder 12 is an example of the opening/closing member and pivots to be closed as indicated by the solid lines in FIG. 1 and to be opened as indicated by the dotted lines in FIG. 1. As illustrated in FIG. 3, the axis R1 about which the document feeder 12 pivots is located toward the rear side of the scanner main body 11 in the −X direction. The end of the document feeder 12 in the +X direction is the free end for pivoting.

As illustrated in FIG. 2, the scanner main body 11 includes a first image sensor 16. The first image sensor 16, which is located under the platen 14, is elongated in the X-axis direction and is movable in the Y-axis direction by a motor (not illustrated). The platen 14 is colorless and transparent and is formed of, for example, glass. The first image sensor 16 may be an optical sensor, such as a CIS optical sensor and a CCD optical sensor.

The document feeder 12 has a document pressing layer 30, which presses a document on the platen 14, on a surface adjacent to the platen 14. The user opens the document feeder 12, places a document on the platen 14, and closes the document feeder 12 such that the document is pressed by the document pressing layer 30. In such a state, the first image sensor 16 is moved in the Y-axis direction to read an image of the document.

The first image sensor 16 can read not only a document on the platen 14 but also a document transported by the document feeder 12. In FIG. 2, a two-dotted chain line T indicates a transportation path of a document P in the document feeder 12. The transportation path T is a path on which the document P is transported and extends from a pick-up roller 21 to the output tray 29. In the document feeder 12, both sides of the document P are readable by the first image sensor 16 and a second image sensor 18, which will be described later.

The document P to be transported is placed on the feeding tray 20 of the document feeder 12. The pick-up roller 21 is located above the +Y-side end of the document P on the feeding tray 20, i.e., above the front end of the document P in the feeding direction. The pick-up roller 21 is movable to be away from the document P on the feeding tray 20 and to be in contact with the document P on the feeding tray 20. The pick-up roller 21 in contact with the document P picks up the document P on the feeding tray 20 and sends the document P to a feeding roller 22 located downstream of the pick-up roller 21.

A separation roller 23 opposes the feeding roller 22 such that the document P is nipped between the feeding roller 22 and the separation roller 23 for separation. Furthermore, a pair of first transportation rollers 24 is disposed downstream of the feeding roller 22 and the separation roller 23. The transportation path T includes a curved reversing path extending from the feeding roller 22 to a pair of output rollers 28 and on which the document is curved and reversed. The document P is curved and reversed while being transported on the transportation path T. Then, an image of the document P is read by the first image sensor 16 and the second image sensor 18 located downstream of a pair of third transportation rollers 26. The first image sensor 16 reads an upper surface of the document P that faces upward when the document P is on the feeding tray 20. The second image sensor 18 reads a lower surface of the document P that faces downward when the document P is on the feeding tray 20.

On the transportation path T, a pair of fourth transportation rollers 27 for transporting the document P is disposed between the first image sensor 16 and the second image sensor 18. The pair of output rollers 28 is disposed downstream of the second image sensor 18. The document P read by the first image sensor 16 and/or the second image sensor 18 is ejected to the output tray 29 by the pair of output rollers 28.

Figure 13:
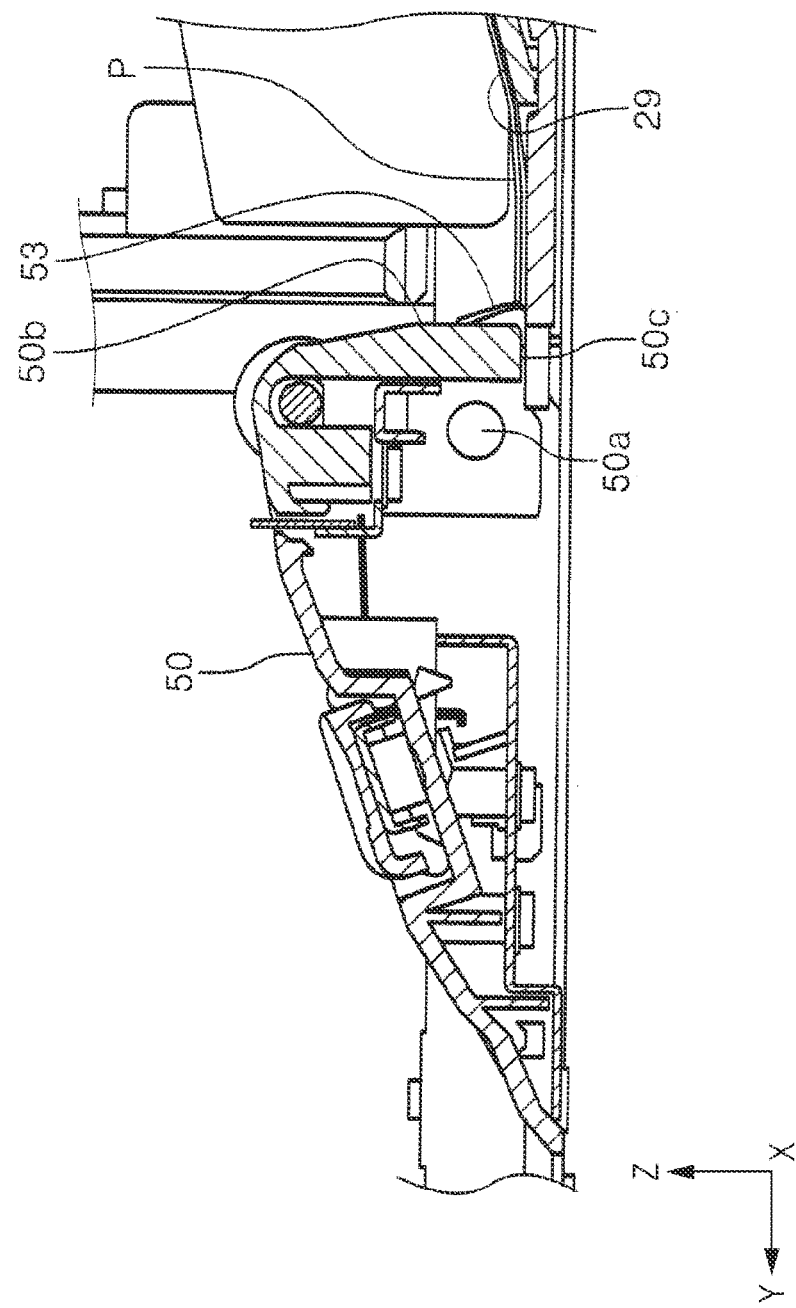
FIG. 13 is a sectional view illustrating an opening portion and components around the opening portion.
Figure 14:
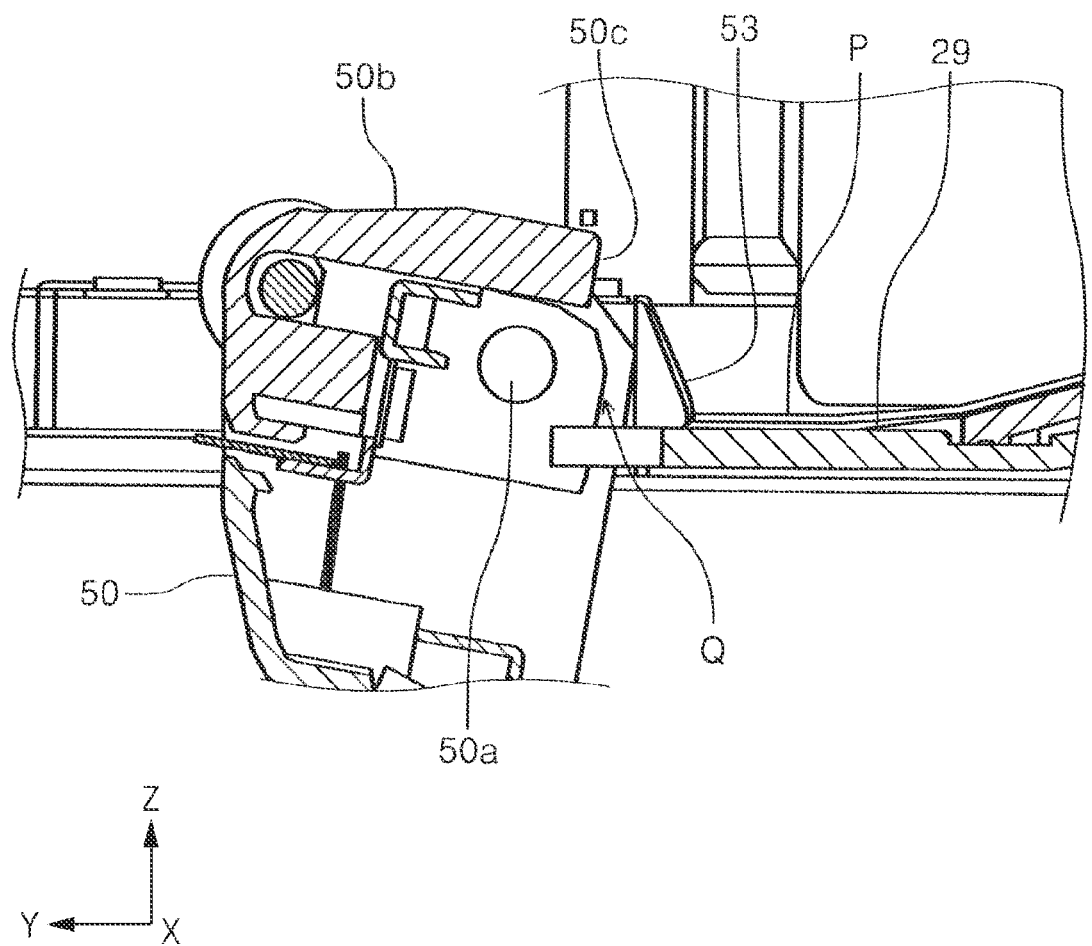
FIG. 14 is a sectional view illustrating the opening portion and components around the opening portion.

The document feeder 12 includes an opening portion 50 that enables a portion of the curved reversing path to be exposed. The opening portion 50 is pivotable about a pivoting shaft 50a illustrated in FIGS. 13 and 14. When the opening portion 50 in FIG. 13 is opened downward as illustrated in FIG. 14, a portion of the curved reversing path is exposed. This enables a paper jam to be cleared when such a paper jam occurs on the curved reversing path. The front end of the document P to be ejected to the output tray 29 comes in contact with a wall 50b, which is a −Y side-end wall, of the opening portion 50. When the opening portion 50 is opened downward as illustrated in FIG. 14, the wall 50b, which is a portion of the opening portion 50, is moved away from the front end of the document P, creating a space Q. The front end of the document P may enter the space Q. If the front end of the document P enters the space Q, the front end of the document P is sandwiched between a lower end 50c of the wall 50b and a portion of the output tray 29 opposing the lower end 50c when the opening portion 50 is closed. This may prevent the opening portion 50 from closing and may damage the front end of the document P. However, as illustrated in FIGS. 13 and 14, a stopper 53, which is a member independent from the opening portion 50, is disposed as a stopper for the front end of the document P to be ejected to the output tray 29. As illustrated in FIG. 14, this does not allow the front end of the document P to enter the space Q when the opening portion 50 is opened, preventing the above-described defect from occurring.

Figure 5:
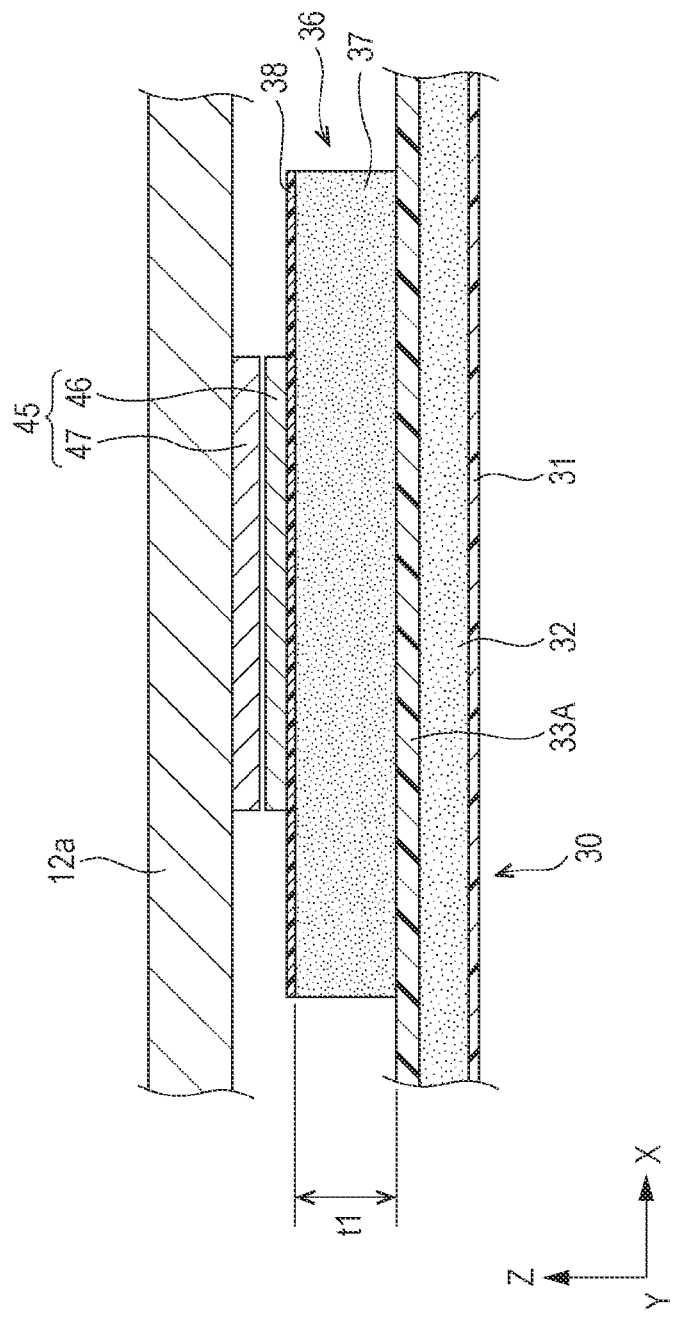
FIG. 5 is a sectional view illustrating a first elastic layer taken along line V-V in FIG. 4.

Next, the document pressing layer 30 is described. As illustrated in FIG. 5, the document pressing layer 30 is disposed on a frame 12a of the document feeder 12 with a connection layer 45 therebetween. The document pressing layer 30 includes, in this order from the end in the −Z direction to the end in the +Z direction in the Z-axis direction or the thickness direction of the document, a mat 31 to be in contact with a document, a leveling member 32 attached to the mat 31 to eliminate irregularities, and a plate layer 33 attached to the leveling member 32.

The mat 31 is a flexible sheet-like member having a smooth surface. For example, a white polypropylene (PP) sheet having a thickness of about 0.2 mm may be used as the mat 31. The leveling member 32 is formed of an elastic material. For example, a sponge member having a thickness of about 3.0 mm may be used as the leveling member 32. The mat 31 and the leveling member 32 may be attached to each other by, for example, an adhesive or a double-sided tape. In this embodiment, an adhesive is used. The area of the mat 31 is substantially the same as the area of the leveling member 32, and an adhesive or a double-sided tape for attaching the mat 31 and the leveling member 32 to each other is disposed over substantially the entire area.

Figure 4:
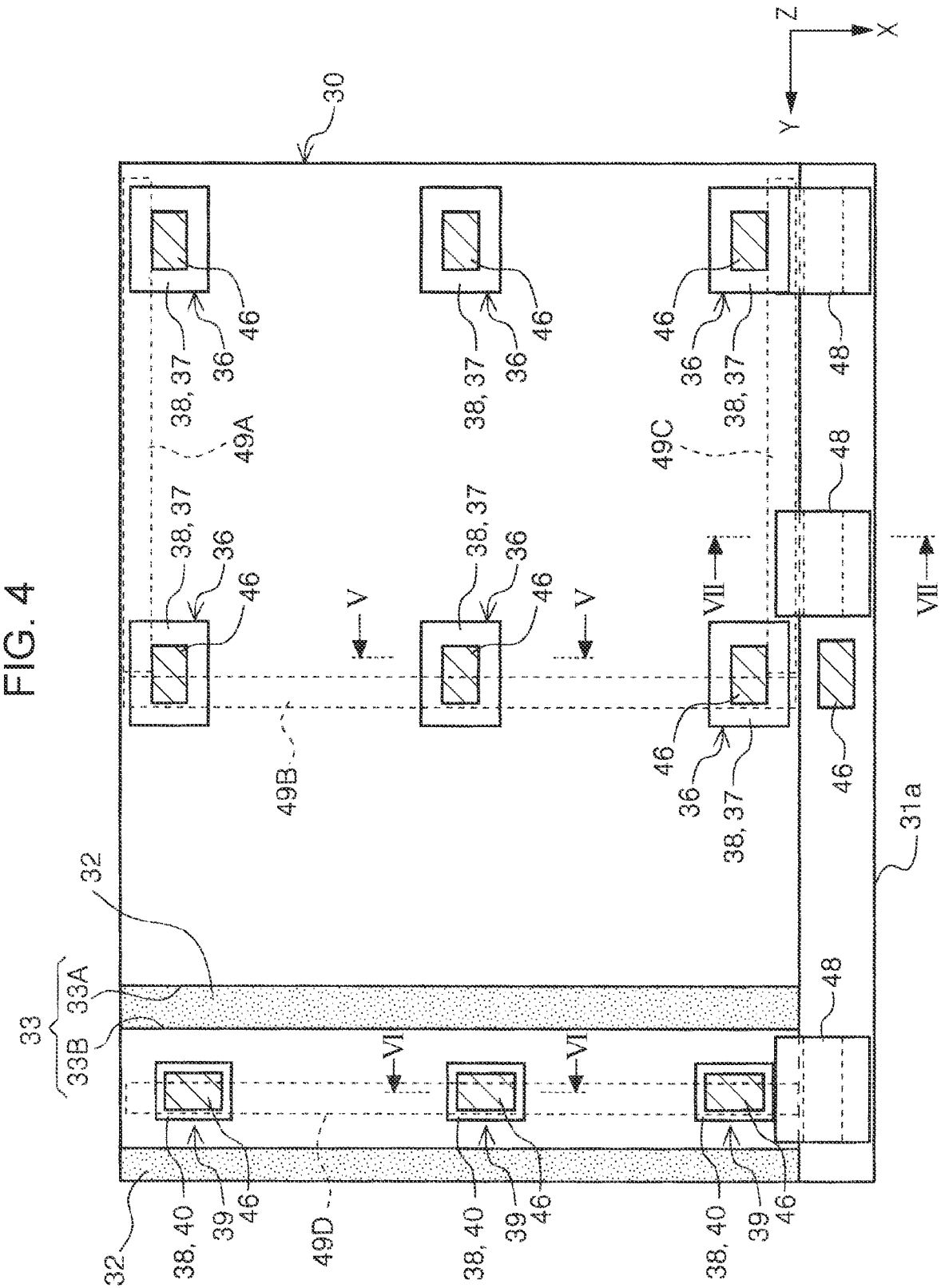
FIG. 4 is a plan view illustrating a document pressing layer.

The plate layer 33 may be formed of an elastic plate. For example, the plate layer 33 may be a polycarbonate plate having a thickness of 1.0 mm. As illustrated in FIG. 4, the plate layer 33 includes a first plate layer 33A and a second plate layer 33B located on the +Y side of the first plate layer 33A. A space exists between the first plate layer 33A and the second plate layer 33B in the Y-axis direction through which a portion of the leveling member 32 is exposed in plan view. Furthermore, a portion of the leveling member 32 protruding from the second plate layer 33B in the +Y direction is also exposed.

The plate layer 33 has such a divided structure, because the opening portion 50 is provided for internal maintenance of the document feeder 12 as illustrated in FIG. 3. In other words, the opening portion 50 is pivotable about the pivoting shaft 50a (FIGS. 13 and 14) having the axis R2 extending in the X-axis direction. When the opening portion 50 is opened, the document pressing layer 30 needs to change its shape as indicated by reference 30-1. If the plate layer 33 has a single-piece structure, the plate layer 33 included in the document pressing layer 30 deforms when the opening portion 50 is opened, preventing the opening portion 50 from opening.

The plate layer 33 and the leveling member 32 are attached to each other by, for example, an adhesive or a double-sided tape. In this embodiment, a double-sided tape is used. In FIG. 4, references 49A, 49B, 49C, and 49D indicate double-sided tapes connecting the plate layer 33 to the leveling member 32. The first plate layer 33A and the leveling member 32 are attached to each other by the double-sided tape 49A extending in the Y-axis direction at the end in the −X direction, by the double-sided tape 49C extending in the Y-axis direction at the end in the +X direction, and by the double-sided tape 49B extending in the X-axis direction in substantially the middle in the Y-axis direction.

The free end for pivoting the document feeder 12 corresponds to the end 31a at the lower end in FIG. 4 or the end in the +X direction. The end 31a is the location at which the document pressing layer 30 starts separating from the document placement surface 14a (FIG. 2). The end 31a is the end of the mat 31 in the +X direction. During the separation, the force of attraction between the mat 31 and the document placement surface 14a pulls the document pressing layer 30 to detach from the frame 12a (FIG. 5). However, the double-sided tape 49B extending in the X-axis direction across the first elastic layer 36 and the connection layer 45, which will be described later, advantageously prevents the detachment. In addition, the double-sided tape 49D extending in the X-axis direction across the second elastic layer 39, which will be described later, advantageously prevents the detachment.

Figure 7:
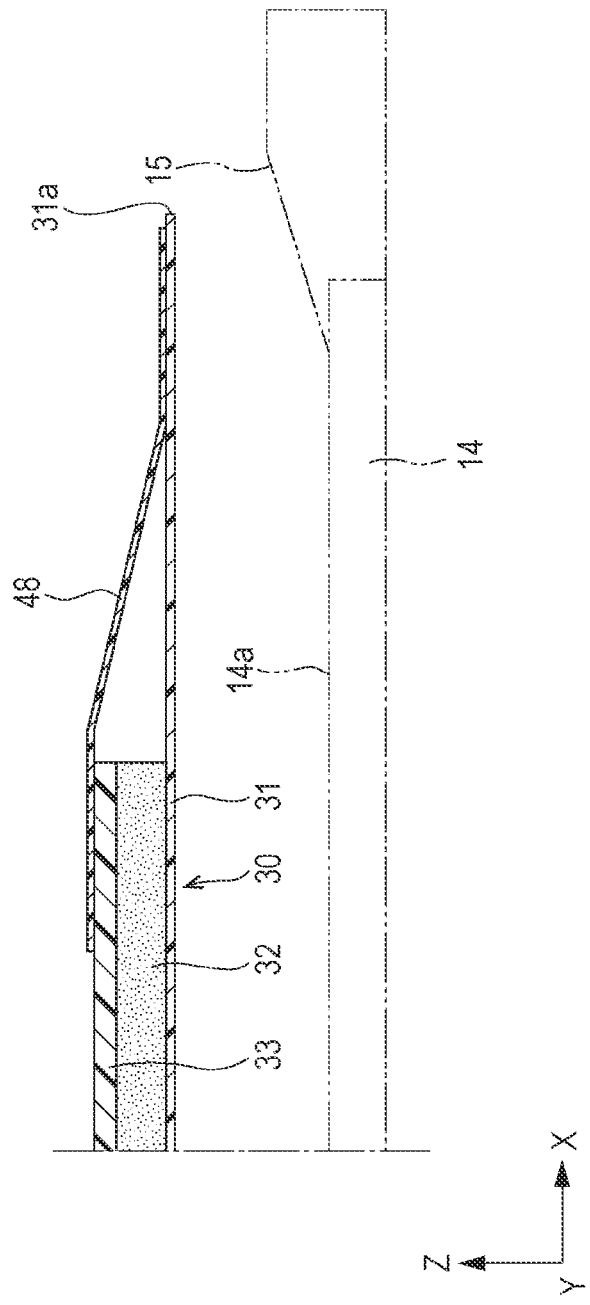
FIG. 7 is a sectional view taken along line VII-VII in FIG. 4 and illustrating a free end of the document pressing layer.

As illustrated in FIGS. 4 and 7, connection sheets 48 are disposed at the end in the +X direction of the document pressing layer 30. As illustrated in FIG. 7, the connection sheet 48 extends from the +Z-side surface of the mat 31 to the +Z-side surface of the document pressing layer 30 and is attached to the mat 31 and the document pressing layer 30 by a double-sided tape or an adhesive. The connection sheet 48 may be a polypropylene (PP) sheet having a thickness of about 0.1 mm. The connection sheet 48 provides the following advantages. A force of attraction may be generated between the mat 31 and the document placement surface 14a when the document feeder 12 is closed. In such a case, separation in the document pressing layer 30 may occur when the closed document feeder 12 is opened. For example, the leveling member 32 may be detached from the mat 31. However, the connection sheets 48 prevent defects. In FIG. 7, the mat 31 is away from the document placement surface 14a by a predetermined distance.

Furthermore, as illustrated in FIG. 4, in an area around the end in the +X direction of the mat 31, a loop layer 46 constituting the connection layer 45, which will be described later, is disposed in the middle in the Y-axis direction. The frame 12a (FIG. 5) of the document feeder 12 has a hook layer 47 (FIG. 5), which is not illustrated in FIG. 4, at a position corresponding to the loop layer 46 to fasten the mat 31 to the frame 12a. This also prevents the separation in the document pressing layer 30 when the document feeder 12 is opened.

As illustrated in FIG. 7, the end 31a of the mat 31 in the +X direction is positioned above a sloping surface 15 adjacent to the document placement surface 14a in the +X direction. This enables air to readily enter the space between the mat 31 and the document placement surface 14a when the document feeder 12 is opened. This also prevents the separation in the document pressing layer 30 when the document feeder 12 is opened. Furthermore, the sloping surface 15 enables the document on the document placement surface 14a to slide thereon in the +X direction and also enables easy removal of the document.

Figure 6:
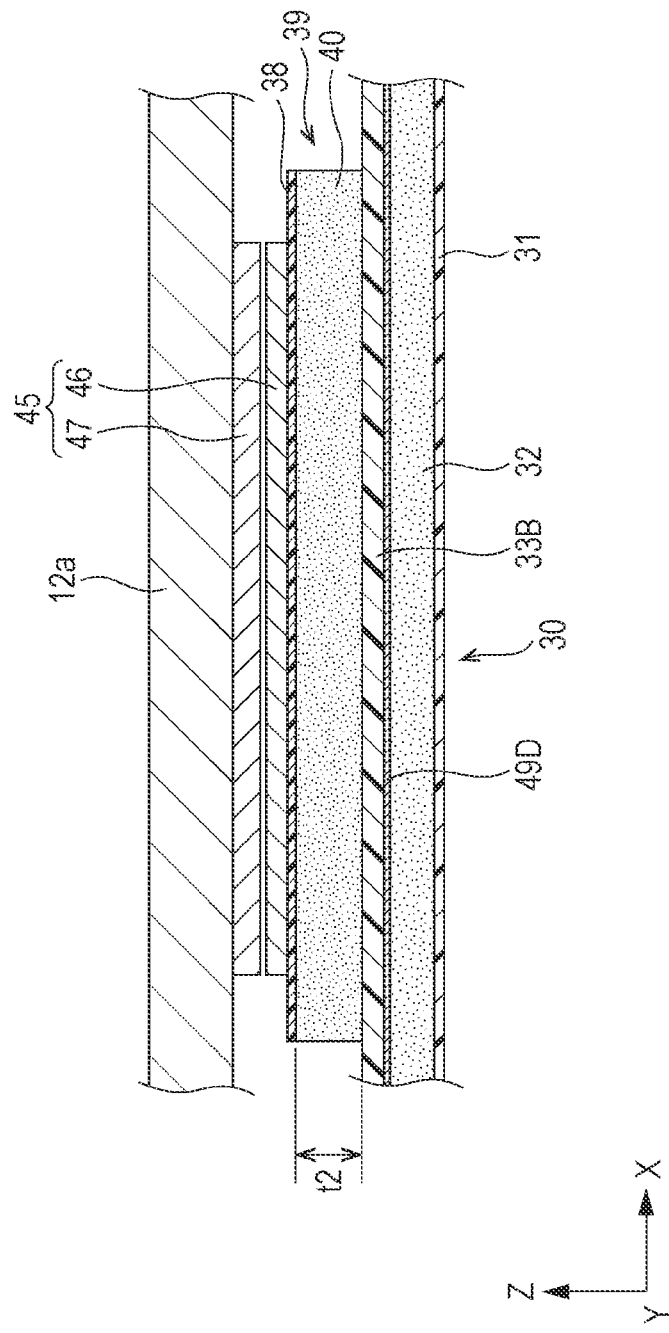
FIG. 6 is a sectional view illustrating a second elastic layer taken along line VI-VI in FIG. 4.

As illustrated in FIGS. 4, 5, and 6, the first elastic layer 36, the second elastic layer 39, and the connection layer 45 connecting the first and second elastic layers 36 and 39 to the frame 12a are disposed between the document pressing layer 30 and the frame 12a. As illustrated in FIG. 5, the first elastic layer 36 includes an elastic member 37 and a resin sheet 38. The elastic member 37 may be formed of a sponge member having a thickness t1 of about 5.0 mm. As illustrated in FIG. 4, the elastic member 37 includes pieces each having a rectangular shape in plan view and spaced apart from each other by a predetermined distance on the first plate layer 33A of the document pressing layer 30. The resin sheet 38 may be a colorless and transparent polypropylene (PP) sheet having a thickness of about 0.1 mm. In this embodiment, the resin sheet 38 includes pieces having the same size and shape in plan view as the pieces of the elastic member 37. The elastic member 37 and the resin sheet 38 are attached to each other by an adhesive or a double-sided tape. In this embodiment, a double-sided tape having the same size and shape in plan view as the elastic member 37 and the resin sheet 38 is used.

As illustrated in FIG. 6, the second elastic layer 39 includes an elastic member 40 and a resin sheet 38. The elastic member 40 may be formed of a sponge member having a thickness t2 of about 3.0 mm. As illustrated in FIG. 4, the elastic member 40 includes pieces each having a rectangular shape in plan view and spaced apart from each other by a predetermined distance on the second plate layer 33B included in the document pressing layer 30. In this embodiment, the resin sheet 38 may be a colorless and transparent polypropylene (PP) sheet having a thickness of about 0.1 mm. In this embodiment, the resin sheet 38 includes pieces having the same size and shape in plan view as the pieces of the elastic member 40. The elastic member 40 and the resin sheet 38 may be attached to each other by an adhesive or a double-sided tape. In this embodiment, a double-sided tape having the same size and shape in plan view as the elastic member 40 and the resin sheet 38 is used.

The first elastic layer 36 is attached to the first plate layer 33A included in the document pressing layer 30 by a double-sided tape having the same size and shape in plan view as the first elastic layer 36. The second elastic layer 39 is attached to the second plate layer 33B included in the document pressing layer 30 by a double-sided tape having the same size and shape in plan view as the second elastic layer 39.

The thickness t2 of the elastic member 40 included in the second elastic layer 39 is less than the thickness t1 of the elastic member 37 included in the first elastic layer 36, because the second elastic layer 39 is located under the opening portion 50 of the document feeder 12 and the installation space of the second elastic layer 39 is smaller in thickness than that of the first elastic layer 36.

The first and second elastic layers 36 and 39 are attached to the frame 12a by the connection layer 45. In this embodiment, the connection layer 45 is a hook-and-loop fastener and includes a loop layer 46 attached to the first and second elastic layers 36 and 39 and a hook layer 47 attached to the frame 12a. The loop layer 46 is attached to the resin sheets 38 of the first and second elastic layers 36 and 39 by a double-sided tape having the same size and shape in plan view as the loop layer 46. The hook layer 47 is attached to the frame 12a by a double-sided tape having the same size and shape in plan view as the loop layer 46. When the hooks (not illustrated) of the hook layer 47 catch the loops (not illustrated) of the loop layer 46, the hook layer 47 and the loop layer 46 are fastened to each other. When the hooks (not illustrated) of the hook layer 47 come off the loops (not illustrated) of the loop layer 46, the hook layer 47 is detached from the loop layer 46. With this configuration, the document pressing layer 30 is detachable from the document feeder 12.

The loop layer 46 and the hook layer 47 may have the same size in plan view or the hook layer 47 may be larger than the loop layer 46. The loop layer 46 may be attached to the hook layer 47 with some misalignment. In such a case, the hook layer 47 larger than the loop layer 46 enables the entire area of the loop layer 46 to be caught by the hook layer 47.

As illustrated in FIGS. 4 to 6, the area of each of the first elastic layer 36 and the second elastic layer 39 is larger than the area of the connection layer 45 in plan view. In this configuration, when the closed document feeder 12, which is one example of the opening/losing member, is opened, the first elastic layer 36 and the second elastic layer 39 are less likely to be pulled up by the connection layer 45 at end portions of the first and second elastic layers 36 and 39, suppressing damage to the first and second elastic layers 36 and 39, more specifically to the elastic members 37 and 40 from occurring. This configuration eliminates the need for a special component for damage suppression, reducing the cost of the device.

The first elastic layer 36 includes the elastic member 37 and the resin sheet 38 covering a surface of the elastic member 37 adjacent to the connection layer 45. The second elastic layer 39 includes the elastic member 40 and the resin sheet 38 covering a surface of the elastic member 40 adjacent to the connection layer 45. When the document feeder 12 is opened, the first elastic layer 36 may be pulled up by the connection layer 45 at a surface of the elastic member 37 adjacent to the connection layer 45. In such a case, the surface of the elastic member 37 is less likely to be locally stripped in this configuration, suppressing damage to the elastic member 37 from occurring. Similarly, when the document feeder 12 is opened, the second elastic layer 39 may be pulled up by the connection layer 45 at a surface of the elastic member 40 adjacent to the connection layer 45. In such a case, the surface of the elastic member 40 is less likely to be locally stripped, suppressing damage to the elastic member 40 from occurring.

Furthermore, in this embodiment, the opening/closing member, which covers and uncovers the platen 14, is the document feeder 12 having the curved reversing path on which the document is curved and reversed as illustrated in FIG. 2. The elastic layers between the document pressing layer 30 and the document feeder 12 include the first elastic layer 36 not overlapping the curved reversing path and the second elastic layer 39 located under the curved reversing path as illustrated in FIG. 2. The elastic member 40 constituting the second elastic layer 39 has a higher density than the elastic member 37 constituting the first elastic layer 36. For example, the density of the elastic member 40 is over ten times higher than that of the elastic member 37. An example of the density of the elastic member 40 is 240 kg/m$^3$ and an example of the density of the elastic member 37 is 16 kg/m$^3$.

The above-described configuration provides the following advantages. The document feeder 12 has the curved reversing path on which the document is curved and reversed. The weight of the portion including the curved reversing path is likely to be high because components, such as a roller and a motor are installed in the portion. Thus, a portion of the document pressing layer 30 under the curved reversing path is likely to be in close contact with the platen 14, increasing the force of attraction between the mat 31 and the document placement surface 14a. In the region, the elastic member 40 included in the second elastic layer 39 is likely to be damaged when the document feeder 12 is opened. However, as described above, the elastic member 40 constituting the second elastic layer 39 has a higher density than the elastic member 37 constituting the first elastic layer 36. This configuration effectively suppresses damage to the elastic member 40 located under the curved reversing path.

Figure 8:
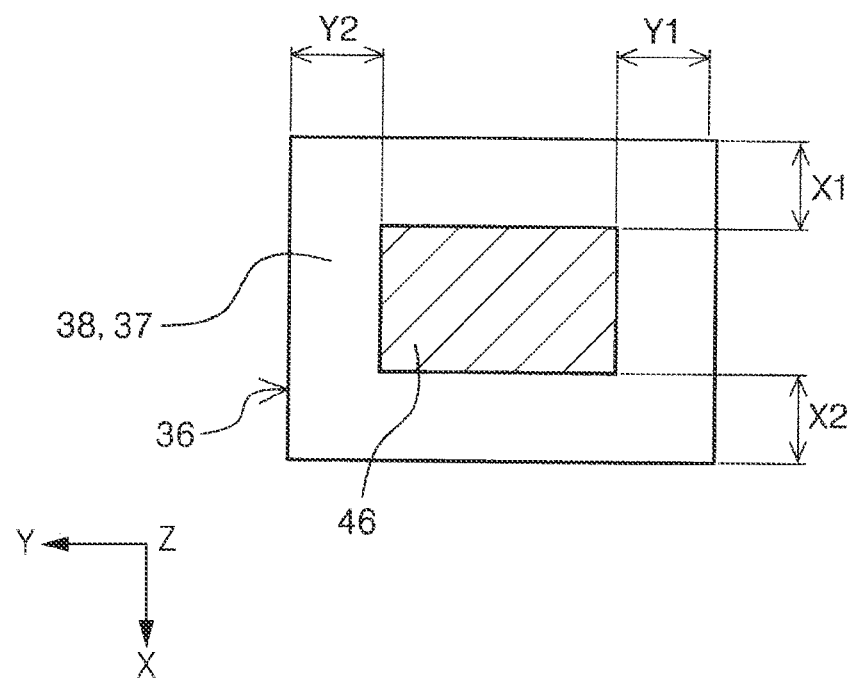
FIG. 8 is a plan enlarged view of the first elastic layer.

Furthermore, in this embodiment, as illustrated in FIG. 4, the first elastic layer 36 protrudes from the connection layer 45 (loop layer 46) over the entire perimeter with the connection layer 45 (loop layer 46) being disposed on the first elastic layer 36. Furthermore, the second elastic layer 39 protrudes from the connection layer 45 (loop layer 46) over the entire perimeter with the connection layer 45 (loop layer 46) being disposed on the second elastic layer 39. With this configuration, the entire end of the first elastic layer 36 is less likely to be damaged and the entire end of the second elastic layer 39 is less likely to be damaged. In this embodiment, as indicated in FIG. 8, the amount X1 of the first elastic layer 36 protruding from the connection layer 45 (loop layer 46) in the −X direction is equal to the amount X2 of the first elastic layer 36 protruding from the connection layer 45 (loop layer 46) in the +X direction in design. The actual amounts X1 and X2 may slightly vary due to manufacturing error. Similarly, the amount Y1 of the first elastic layer 36 protruding from the connection layer 45 (loop layer 46) in the −Y direction is equal to the amount Y2 of the first elastic layer 36 protruding from the connection layer 45 in the +Y direction in design. The actual amounts Y1 and Y2 may slightly vary due to manufacturing error. The second elastic layer 39 also protrudes from the connection layer 45 (loop layer 46) by a predetermined amount. Each of the protruding amounts X1, X2, Y1, and Y2 is 1.0 mm or more.

In the document feeder 12 configured to pivot to cover and uncover the platen 14, when the closed document feeder 12 is opened, the first elastic layer 36 or the second elastic layer 39 is likely to be pulled up by the connection layer 45 at a portion around the free end of the document feeder 12 or an end portion in the +X direction. Thus, the end portion may be damaged. However, the configuration in which the elastic layers protrude from the connection layer 45 (loop layer 46) at least in the +X direction effectively suppresses the damage at the end of the elastic layers 36 and 39 in the +X direction. Specifically described, when the elastic layers 36 and 39 protrude by the amount X2 as illustrated in FIG. 8, damage at the end in the +X direction is effectively limited. The other amounts X1, Y1, and Y2 may be set at 0 mm in design as long as the elastic layers 36 and 39 protrude by the amount X2. This reduces the volumes of the elastic layers and reduces the cost.

In this embodiment, the connection layer 45 is a hook-and-loop fastener including the loop layer 46 and the hook layer 47 pressed together for fastening. The hook layer 47 is disposed on the frame 12a. The loop layer 46 is disposed on the first and second elastic layers 36 and 39. This provides the following advantages. If the loop layer 46 and the hook layer 47 are repeatedly attached and detached from each other, the loops of the loop layer 46 will be damaged, reducing the fastening strength. However, the loop layer 46, which is likely to be damaged, is disposed on the first and second elastic layers 36 and 39 in this embodiment. This enables the loop layer 46 to be readily replaced when the fastening strength is reduced.

Instead of the sponge member used in the above-described embodiment, another elastic material may be used as the leveling member 32, the elastic member 37, and the elastic member 40. Instead of the materials used in the above-described embodiment, another elastically deformable material may be used as the mat 31, the plate layer 33, and the resin sheet 38. Furthermore, instead of a hook-and-loop fastener in the above-described embodiment, another type of fastener may be used as the connection layer 45. When the fastener is not required to be detachable, a double-sided tape or an adhesive may be used.

Figure 9:
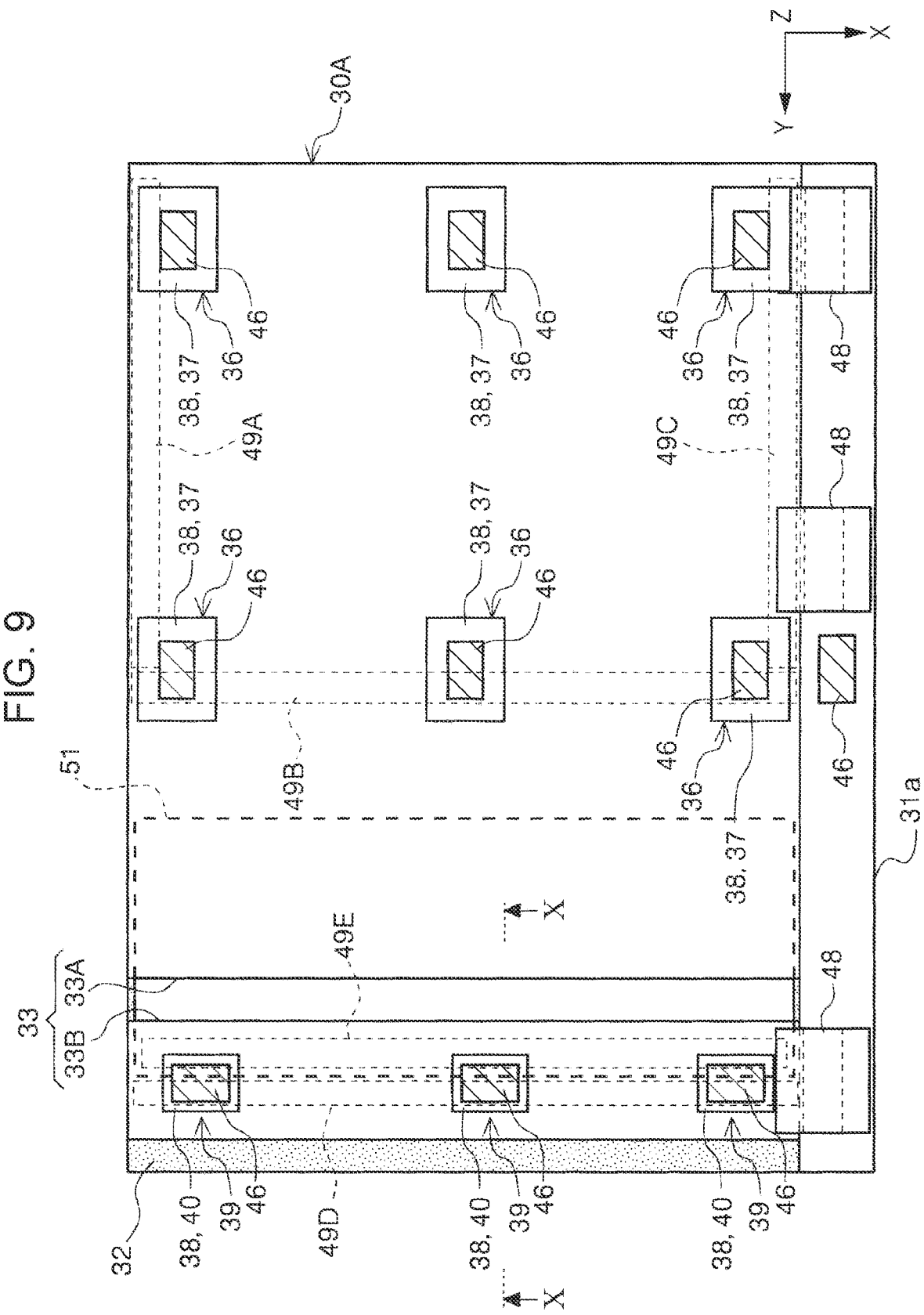
FIG. 9 is a plan view illustrating a document pressing layer according to Embodiment 2.
Figure 10:
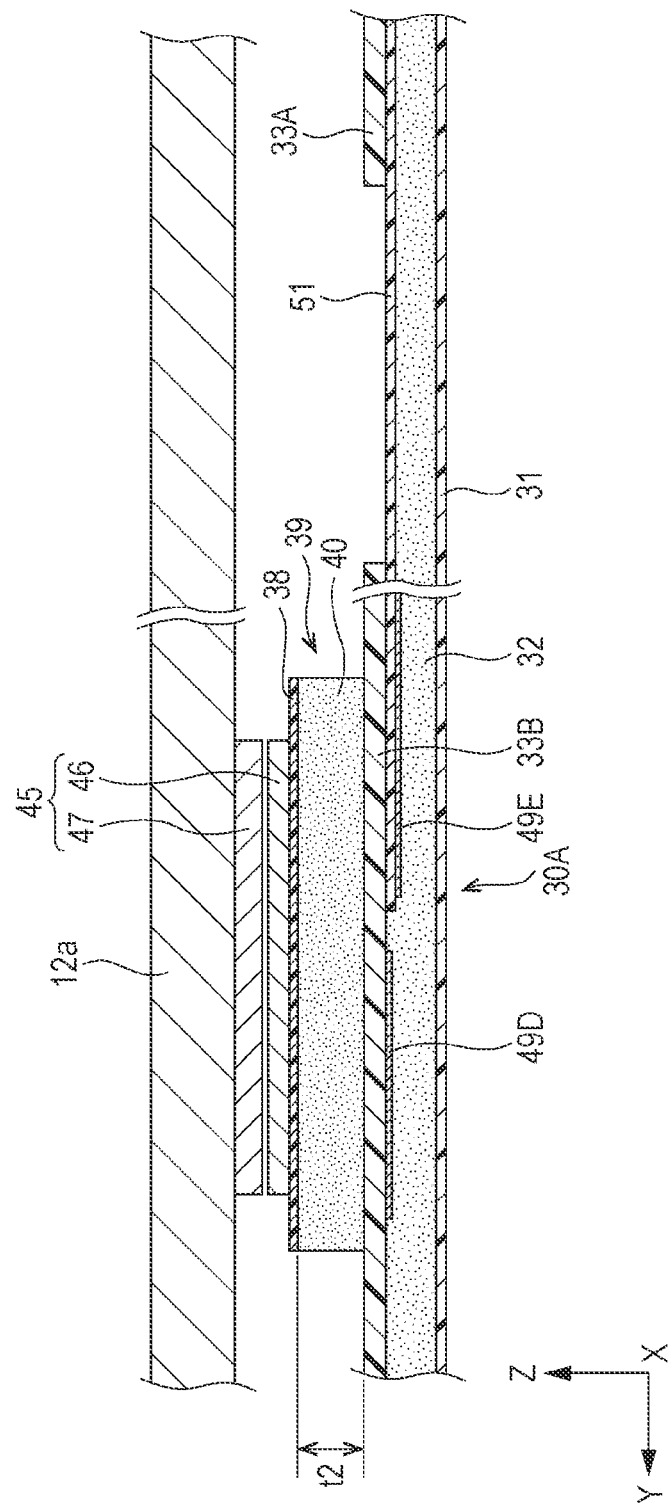
FIG. 10 is a sectional view taken along line X-X in FIG. 9.
Figure 11:
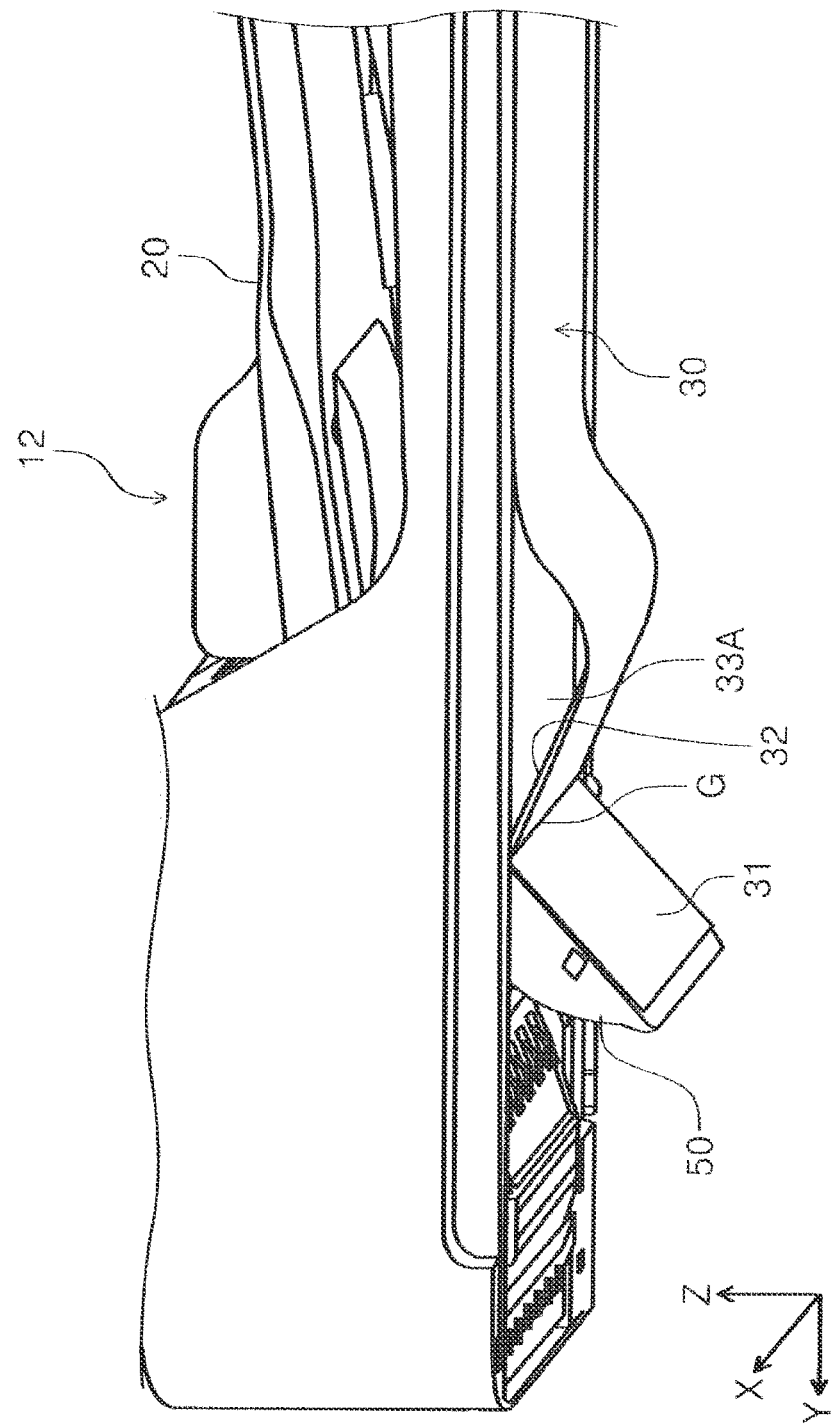
FIG. 11 is a perspective view illustrating how the document pressing layer according to Embodiment 1 deforms.
Figure 12:
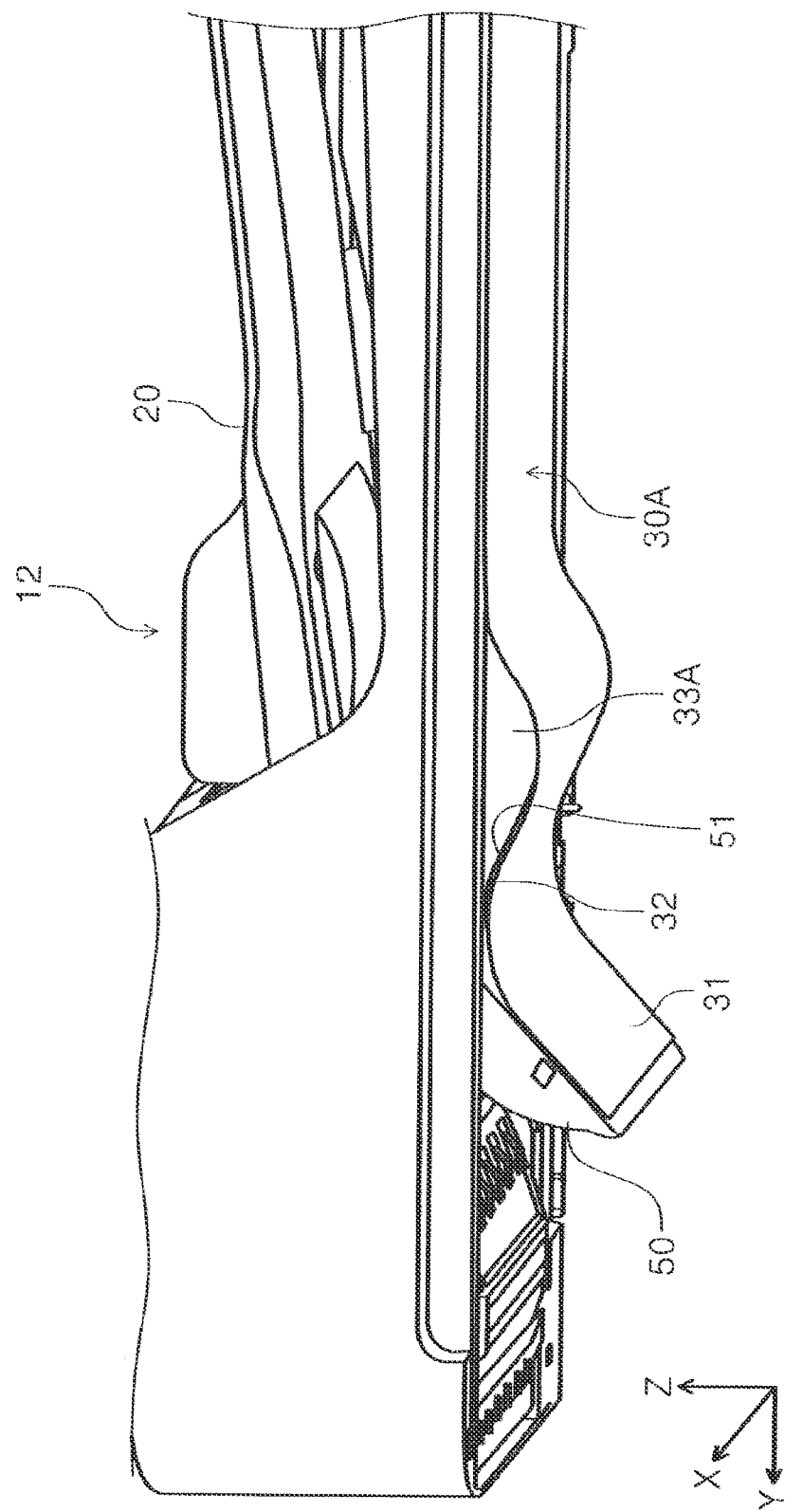
FIG. 12 is a perspective view illustrating how the document pressing layer according to Embodiment 2 deforms.

Next, a document pressing layer in Embodiment 2 is described with reference to FIGS. 9 to 12. In FIGS. 9, 10, and 12, reference 30A is assigned to the document pressing layer according to Embodiment 2. In FIGS. 9 to 12, the same references are assigned to the same components as those in Embodiment 1 without duplicated explanation. FIG. 11 illustrates the document pressing layer 30 according to Embodiment 1 for comparison. The document pressing layer 30A according to Embodiment 2 is characterized in that an intermediate sheet 51 is disposed between the plate layer 33 and the leveling member 32. As described above, the plate layer 33 is divided into the first plate layer 33A and the second plate layer 33B such that the opening portion 50 is opened. In other words, the plate layer 33 includes the first plate layer 33A not overlapping the opening portion 50 and the second plate layer 33B spaced apart from the first plate layer 33A in the +Y direction and overlapping the opening portion 50. The second plate layer 33B moves together with the opening portion 50 when the opening portion 50 is opened and closed.

When the opening portion 50 is opened, the leveling member 32 and the mat 31 included in the document pressing layer 30 deform. If the leveling member 32 does not slip against the plate layer 33 at this time, the mat 31 and the leveling member 32 are unnaturally curved and partially bent as indicated by reference G in FIG. 11 when the opening portion 50 is opened. In particular, the mat 31 may have an undesirable fold line. To solve the problem, as illustrated in FIGS. 9 and 10, the intermediate sheet 51 extending from the second plate layer 33B to the first plate layer 33A is disposed between the leveling member 32 and the plate layer 33. The intermediate sheet 51 is attached to the leveling member 32 with a double-sided tape 49E at a portion overlapping the second plate layer 33B and is not fixed to the leveling member 32 at a portion overlapping the first plate layer 33A.

The leveling member 32 slides against the first plate layer 33A when the opening portion 50 is opened, because the coefficient of friction between the intermediate sheet 51 and the leveling member 32 is smaller than that between the plate layer 33 and the leveling member 32. Thus, the mat 31 and the leveling member 32 are naturally curved as illustrated in FIG. 12, suppressing the possibility that the mat 31 has an undesirable fold line. At this time, the intermediate sheet 51 slides against the first plate layer 33A and is curved together with the mat 31 and the leveling member 32. The intermediate sheet 51 may be formed of a polyethylene terephthalate (PET) sheet having a thickness of 0.05 mm.

The technical scope of the present disclosure is not limited to the above-described embodiments. Various modifications may be added to the disclosure without departing from the scope of the disclosure understood from the claims, and the modifications are included in the scope of the disclosure.

What is claimed is:

1. An image reading apparatus comprising:
   a platen on which a document is to be placed;
   an image sensor configured to read an image of the document on the platen;
   a document feeder configured to cover and uncover the platen;
   a first layer disposed on a surface of the document feeder and pressing the document on the platen when the document feeder covers the platen;
   elastic layers located between the first layer and the document feeder and spaced apart from each other on a surface of the first layer; and
   connection layers disposed between the elastic layers and the document feeders and connecting the elastic layers to the document feeder, wherein
   an area of the elastic layer, in a first axis and second axis intersecting the first axis, is larger than an area of the connection layer, in the first axis and the second axis, when viewed directly from a top of the elastic layer and the connection layer along a height direction of the image reading apparatus perpendicular to the first axis and second axis.

2. The image reading apparatus according to claim 1, wherein the elastic layers include (i) an elastic member and (ii) a sheet covering a surface of the elastic member adjacent to corresponding one of the connection layers.

3. The image reading apparatus according to claim 2, wherein
the document feeder includes (i) a tray on which the document is to be placed and (ii) a curved reversing path on which the document from the tray is to be curved and reversed,
the elastic layers include a first elastic layer not overlapping below the curved reversing path and a second elastic layer located under the curved reversing path, and
the elastic member constituting the second elastic layer has a lower density than the elastic member constituting the first elastic layer.

4. The image reading apparatus according to claim 1, wherein the elastic layers protrude from the connection layers over entire perimeters of the connection layers with the connection layers being disposed on the elastic layers.

5. The image reading apparatus according to claim 1, wherein
the document feeder is configured to pivot to cover and uncover the platen, and
the elastic layers protrude from the connection layers at least toward a free end of the document feeder with the connection layers being disposed on the elastic layers.

6. The image reading apparatus according to claim 1, wherein
the connection layers comprise a hook-and-loop fastener including a loop layer and a hook layer pressed together for fastening, and
the hook layer is disposed on the document feeder and the loop layer is disposed on corresponding one of the elastic layers.

7. The image reading apparatus according to claim 1, wherein the first layer includes, in this order from the platen to the document feeder in a thickness of the document, a mat to be in contact with a document, a leveling elastic member attached to the mat to eliminate irregularities, and a plate layer attached to the leveling elastic member.

8. The image reading apparatus according to claim 3, wherein
the first layer includes, in this order from the platen to the document feeder in a thickness of a document, a mat to be in contact with a document, a leveling elastic member attached to the mat to eliminate irregularities, and a plate layer attached to the leveling elastic member,
the document feeder includes a document feeder door being opened downward to expose a portion of the curved reversing path,
the plate layer includes a first plate layer not overlapping the document feeder door and a second plate layer spaced apart from the first plate layer and overlapping the document feeder door, the second plate layer being configured to move together with the document feeder door when the document feeder door is opened and closed,
an intermediate sheet extending from the second plate layer to the first plate layer is disposed between the leveling elastic member and the plate layer, and
a coefficient of friction between the intermediate sheet and the leveling elastic member is smaller than a coefficient of friction between the plate layer and the leveling elastic member.

9. The image reading apparatus according to claim 2, wherein
the document feeder is configured to pivot to cover and uncover the platen, and
the elastic layers protrude from the connection layers at least toward a free end of the document feeder with the connection layers being disposed on the elastic layers.

10. The image reading apparatus according to claim 2, wherein
the connection layers comprise a hook-and-loop fastener including a loop layer and a hook layer pressed together for fastening, and
the hook layer is disposed on the document feeder and the loop layer is disposed on corresponding one of the elastic layers.

11. The image reading apparatus according to claim 3, wherein
the document feeder is configured to pivot to cover and uncover the platen, and
the elastic layers protrude from the connection layers at least toward a free end of the document feeder with the connection layers being disposed on the elastic layers.

12. The image reading apparatus according to claim 3, wherein
the connection layers comprise a hook-and-loop fastener including a loop layer and a hook layer pressed together for fastening, and
the hook layer is disposed on the document feeder and the loop layer is disposed on corresponding one of the elastic layers.

13. The image reading apparatus according to claim 4, wherein
the connection layers comprise a hook-and-loop fastener including a loop layer and a hook layer pressed together for fastening, and
the hook layer is disposed on the document feeder and the loop layer is disposed on corresponding one of the elastic layers.

14. The image reading apparatus according to claim 5, wherein
the connection layers comprise a hook-and-loop fastener including a loop layer and a hook layer pressed together for fastening, and
the hook layer is disposed on the document feeder and the loop layer is disposed on corresponding one of the elastic layers.

15. The image reading apparatus according to claim 9, wherein
the connection layers comprise a hook-and-loop fastener including a loop layer and a hook layer pressed together for fastening, and
the hook layer is disposed on the document feeder and the loop layer is disposed on corresponding one of the elastic layers.

16. The image reading apparatus according to claim 11, wherein
the connection layers comprise a hook-and-loop fastener including a loop layer and a hook layer pressed together for fastening, and
the hook layer is disposed on the document feeder and the loop layer is disposed on corresponding one of the elastic layers.

17. The image reading apparatus according to claim 1, wherein
the image sensor is elongated in a first axis and configured to read the image while moving in a second axis intersecting the first axis.

18. The image reading apparatus according to claim 16, wherein
the elastic layers are located apart in first and second axes, and
the connection layers are located apart in the first and second axes.

19. The image reading apparatus according to claim 17, wherein the first layer covers the whole of the elastic layers and connection layers.

20. An image reading apparatus comprising:
a platen on which a document is to be placed;
an image sensor configured to read an image of the document on the platen;
a document feeder configured to cover and uncover the platen;
a first layer disposed on a surface of the document feeder and pressing the document on the platen when the document feeder covers the platen;
elastic layers located between the first layer and the document feeder and spaced apart from each other on a surface of the first layer; and
connection layers disposed between the elastic layers and the document feeders and connecting the elastic layers to the document feeder, wherein
an area of the elastic layer, in a first axis and second axis intersecting the first axis, is larger than an area of the connection layer, in the first axis and the second axis, when viewed directly from a top of the elastic layer and the connection layer along a height direction of the image reading apparatus perpendicular to the first axis and second axis, and
where the surface of the elastic layer and the surface of the connection layer are attached to each other.

* * * * *